United States Patent
Ison et al.

(10) Patent No.: US 8,388,280 B1
(45) Date of Patent: Mar. 5, 2013

(54) STEP DRILL BIT

(75) Inventors: Orlo D. Ison, Gilbert, AZ (US);
Brandon Ray, Gilbert, AZ (US)

(73) Assignee: Orlo Ison, Gilbert, AZ (US)

( * ) Notice: Subject to any disclaimer, the term of this patent is extended or adjusted under 35 U.S.C. 154(b) by 719 days.

(21) Appl. No.: 12/245,350

(22) Filed: Oct. 3, 2008

Related U.S. Application Data

(60) Provisional application No. 60/977,525, filed on Oct. 4, 2007.

(51) Int. Cl.
*B23B 51/02* (2006.01)
(52) U.S. Cl. ......... 408/224; 408/144; 408/225; 408/231
(58) Field of Classification Search .......... 408/223–225, 408/227, 230, 231, 233, 144–145; 407/118, 407/119; *B23B 51/00, 51/02*
See application file for complete search history.

(56) References Cited

U.S. PATENT DOCUMENTS

| 180,554 | A | * | 8/1876 | Cubberley | ............ 408/230 |
| 2,555,746 | A | * | 6/1951 | Horsky et al. | ............ 408/59 |
| 2,897,696 | A | * | 8/1959 | Tisserant | ............ 408/225 |
| 3,564,945 | A | * | 2/1971 | Bradley | ............ 408/224 |
| 4,561,812 | A | * | 12/1985 | Linden | ............ 408/225 |
| 4,582,458 | A | * | 4/1986 | Korb et al. | ............ 408/224 |
| 5,609,447 | A | * | 3/1997 | Britzke et al. | ............ 408/230 |
| 2007/0264094 | A1 | * | 11/2007 | Seeley | ............ 408/224 |

FOREIGN PATENT DOCUMENTS

| CN | 201151004 Y | * | 11/2008 |
| DE | 19526686 A1 | * | 3/1996 |
| JP | 58010414 A | * | 1/1983 |
| JP | 63016912 A | * | 1/1988 |
| JP | 2007203396 A | * | 8/2007 |

OTHER PUBLICATIONS

Machine translation of JO 2007-203396 from EPO website, printed on Sep. 27, 2011.*

* cited by examiner

*Primary Examiner* — Daniel Howell
(74) *Attorney, Agent, or Firm* — Booth Udall Fuller, PLC

(57) ABSTRACT

A step drill bit includes a shaft for coupling the step drill bit to a drill and a drill bit portion coaxially coupled to the shaft. The drill bit portion has a plurality of step portions. The drill bit portion may further include three cutting edges wherein the cutting edges are spaced around the drill bit in substantially equal arc angles. The step drill bit further includes surface treatment having a first coating formed of first material and a second coating formed of a second material that is applied over the first coating. The step drill bit further includes a replaceable drill bit tip.

19 Claims, 2 Drawing Sheets

STEP DRILL BIT

CROSS REFERENCE TO RELATED APPLICATIONS

This application claims priority of U.S. Provisional Patent Application 60/977,525 filed Oct. 4, 2007, the disclosure of which is hereby incorporated entirely herein by reference.

BACKGROUND OF THE INVENTION

1. Technical Field

This invention relates generally to step drill bits and more particularly to a step drill bits having a removable drill bit tip and more particularly to a step drill bit having three cutting edges.

2. State of the Art

There are various types of drill bits that are used in construction, fabrication or other types of manufacturing processes. Drill bits come in various sizes and for various purposes. Among the many different types of drill bits are step drill bits.

A step bit is a conical shaped bit with a stair-step profile. Due to the design of a step bit, a single bit can be used for drilling a wide range of hole sizes. The bits my come in various sizes having varying step sizes to allow a user to utilize the bit that has the proper step sizes to cut holes with the desired diameter.

Step bits are most commonly used in general construction, electrical applications within buildings and plumbing. One step drill bit may be used to drill a range of holes necessary for the particular type of construction or work being performed by the user. The bits are more commonly used on softer materials, such as plywood, particle board, drywall, acrylic, laminate, and the like. However, particular step bits may be used on other harder materials such as sheet metal and the like.

There are however, drawbacks to the conventional step drill bits. Conventional step drill bits come with one or two cutting edges and each has its own limitations. A step bit with one cutting edge is commonly used to because it allows the user to cut holes with little wobble or little inaccuracy. However, having only one cutting edge has greater wear because only one edge doing all of the cutting and as that edge performs the cuts, it wears quickly. Additionally, one cutting edge is inefficient because each cut is performed every revolution of the drill bit.

Conventional step bits having two cutting edges increases the efficiency of the drilling of the bit by having two edges allowing for the cutting to be performed every half turn of the step bit. However, step bits with two cutting has less accuracy in obtaining the proper hole diameter because there tends to be wobble in the bit and less stability during the drilling process. Further, the efficiency of the cut is limited to cutting a particular diameter every half turn and the wear of the edges is longer that the step bit with one cutting edge, but it is still limited in life.

Accordingly, there is a need in the field of step drill bits for an improved step drill bit.

DISCLOSURE OF THE INVENTION

The present invention relates to a step drill bit having three cutting edges that extend along the length of the bit and a replaceable drill bit tip. The step drill bit includes various surface treatments to reduce the wear of the bit, thereby increasing the life of the bit.

An aspect of the present invention includes a step drill bit having a shaft for coupling the step drill bit to a drill and a drill bit portion coaxially coupled to the shaft, the drill bit portion having a plurality of step portions. The drill bit portion may further include three cutting edges wherein the cutting edges are spaced around the drill bit in substantially equal arc angles.

Other aspects of the step drill bit may include a surface treatment to strengthen the drill bit and decrease wear on the bit. Accordingly, the bit may comprise a first coating formed of first material. The step drill bit may further comprise a second coating formed of a second material that is applied over the first coating. The first material may be titanium and the second material may be cobalt. This allows for the bit to maintain a cooler temperature during operation than conventional step bits, creates a smoother hole, reduces friction of the step bit during operation, and increases the life of the step drill bit.

Further still, other aspects of the present invention may include a step drill bit having a replaceable drill bit tip. The tip tends to be the first portion of the drill bit portion to wear out since all holes drilled with a step drill bit need to be started with the tip of the drill bit portion. Having a replaceable drill bit tip allows for a user to replace only the tip and utilize the entire life of the rest of the drill bit portion.

The foregoing and other features and advantages of the present invention will be apparent from the following more detailed description of the particular embodiments of the invention, as illustrated in the accompanying drawings.

BRIEF DESCRIPTION OF THE DRAWINGS

The invention will hereinafter be described in conjunction with the appended drawings where like designations denote like elements, and.

DETAILED DESCRIPTION OF EMBODIMENTS OF THE INVENTION

Figure 1:
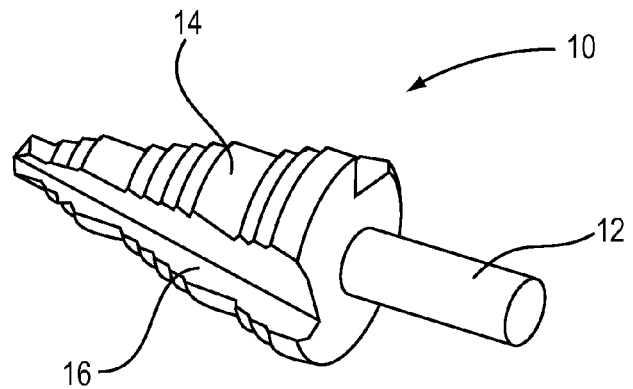
FIG. 1 is a perspective view of a step drill bit in accordance with the present invention.

As discussed above, embodiments of the present invention relate to a step drill bit having three cutting edges that extend along the length of the bit. The step drill bit includes various surface treatments to reduce the wear of the bit, thereby increasing the life of the bit.

Referring to the drawings, FIGS. 1-4 depict a step drill bit 10 in accordance with embodiments of the present invention. The step bit 10 includes a shaft 12 and a drill bit portion 14. The shaft 12 is configured for removably coupling to a drill for operation of the step bit 10. The drill bit tip is removably coupled to the drill bit and wherein said drill bit tip comprises a centrally located shaft. The drill bit portion 14 may include three cutting edges 16, 18, and 20. The drill bit portion 14 may further include a plurality of steps 22 within a predetermined range of diameters.

The cutting edges 16, 18 and 20 may be equally spaced around the drill bit portion 14. For example, and without limitation, the cutting edges 16, 18, and 20 may be spaced substantially equal arc angles from each other. Further, according to particular embodiments of the present invention, the cutting edges 16, 18, and 20 may be located within respective planes 17, 19 and 21 that extend the length of the drill bit portion 14, wherein the planes 17, 19 and 21 do not intersect the axis 24 of the step drill bit 10. The planes 17, 19 and 21 may be further configured such that they intersect each other at equal angles 40. In particular embodiments, the angles 40 may be approximately sixty degrees. It will be understood that while it is shown that the cutting edges 16, 18, and 20 are spaced a particular angle from each other and further that they lie in planes as discussed above, these are not limitations of the present invention, but are rather provided for the exemplary purposes of this disclosure. The cutting edges 16, 18, and 20 may lie within planes that are oriented in various ways.

The cutting edges 16, 18, and 20 of the drill bit portion 14 may further allow for greater dissipation of heat during operation of the step bit 10. The cutting edges 16, 18, and 20 share in the cutting of the hole and since there are three cutting edges; one cutting edge is not doing all of the work and is therefore not heated as is the cutting edge of conventional step drill bits.

Figure 5:
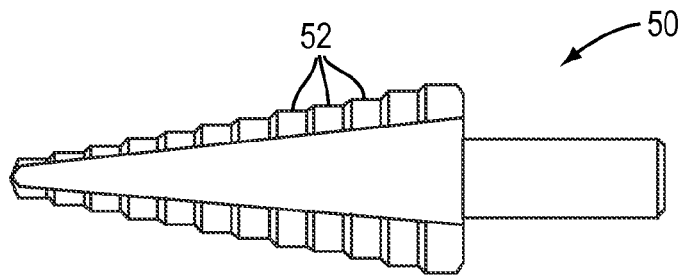
FIG. 5 is a section view of a step drill bit in accordance with the present invention.

Referring further to the drawings, FIG. 5 depicts a section view of a step drill bit 30 of the step drill bit 10 of FIG. 1. The drill bit portion 14 may be formed of a steel portion 32. According to particular embodiments of the present invention, the drill bit may have certain surface treatments that provides the benefits of operating at a cooler temperature, creating smoother holes, reducing friction during drilling and increasing the bit life. The surface treatment may include a first coating 34, wherein the first coating 34 is formed of titanium. Additionally, other embodiments of the present invention may include a second coating 36, wherein the second coating 36 is formed of cobalt. It will be understood that while the first coating 34 is formed of titanium and the second coating 34 is formed of cobalt, the present invention is not limited to these types of materials for the coating. Any type of coating may used so long as the coating as the same benefits and properties as titanium and cobalt respectively. It is contemplated that in accordance with particular embodiments of the present invention that the material properties of the first coating 34 have equivalent properties of titanium and the material properties of the second coating 36 have equivalent properties of cobalt.

It will be understood that while the surface treatment is shown applied to a step drill bit having three cutting edges, it is not limited to only step drill bits having three cutting edges. The surface treatment may be applied to step drill bits having one cutting edge, two cutting edges or a plurality of cutting edges.

Figure 2A:
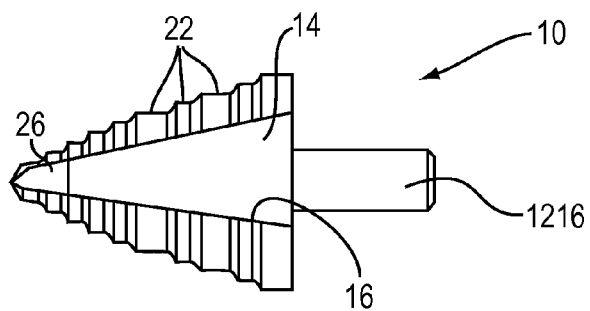
FIGS. 2A and 2B are side views of a step drill bit in accordance with the present invention.
Figure 2B:
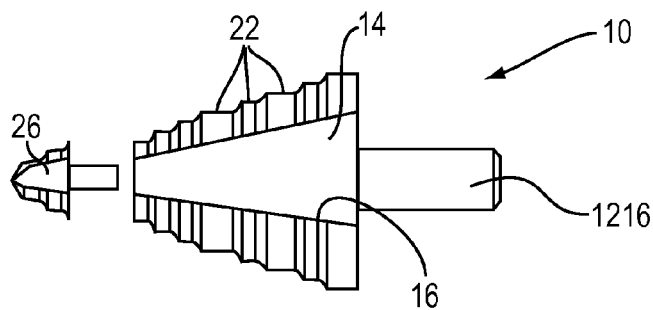
Figure 3:
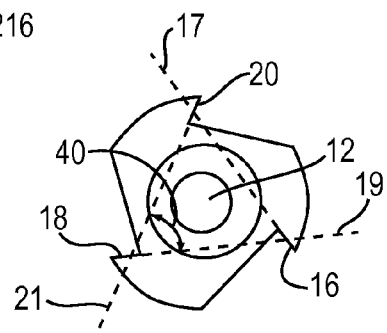
FIG. 3 is a bottom view of a step drill bit in accordance with the present invention.
Figure 4:
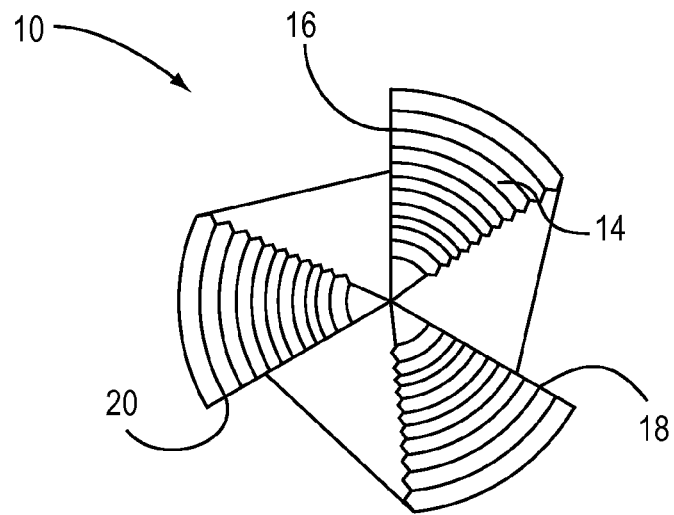
FIG. 4 is a top view of a step drill bit in accordance with the present invention.

Referring to the drawing further and particularly to FIGS. 2A-2B, embodiments of the present invention may include a replaceable drill bit tip 26. The drill bit tip 26 may be a predetermined portion of the drill bit portion 14. The drill bit tip 26 may include a centrally located connection shaft and the drill bit portion may include a corresponding recess. The drill bit tip 26 may be removably coupled to the drill bit portion 14. The drill bit tip 26 is typically the first portion of the drill bit portion 14 that wears out first and replacement of the drill bit tip 26 allows the remainder of the drill bit portion 14 to be utilized longer. It will be understood that the drill bit tip 26 may be coaxially coupled to the drill bit portion 14 in various ways, including but not limited to, a ball and groove coupling, a press fit coupling, a set bolt, a lock fit and any other type of removable coupling that does not interfere with the functionality of the step drill bit 10.

Particular embodiments of the drill bit tip 26 may be used on all types of step drill bits, such as, but not limited to, a step drill bit with a one cutting edge, a step drill bit with two cutting edges, a step drill bit with three cutting edges, a step drill bit with a plurality of cutting edges and the like. Further, while the drill bit tip 26 is shown to be staggered or in other words have step portions, any type of drill tip may be used, such as, without limitation, a typical drill bit tip, wherein the drill bit tip includes one type of drill bit and the drill bit portion includes another type of drill bit.

Further still, other particular embodiments of the drill bit tip 26 may include a drill bit tip 26 that may be used on any size of step drill bit. This allows for a user to have several sizes of step drill bits with replaceable drill bit tips 26 and utilize the same drill bit tips 26 for each size of step drill bit. This simplifies the replacement of the drill bit tips and makes replacement the drill bit tip more efficient. Other embodiments may include drill bit tips that are specific as to the size of the step drill bit.

Alternatively, particular embodiments of the present invention may not utilize replaceable drill bit tips. These particular embodiments may include a replaceable drill bit sleeve. The drill bit sleeve may include one or more cutting edges and may be coupled to a drill bit or drill bit form, wherein the drill bit sleeve comprises a recess that corresponds to the drill bit or drill bit form. The sleeve may be coupled to the drill bit or the drill bit form by use of a press fit, a set bolt, a ball and groove connection and the like.

Figure 6:
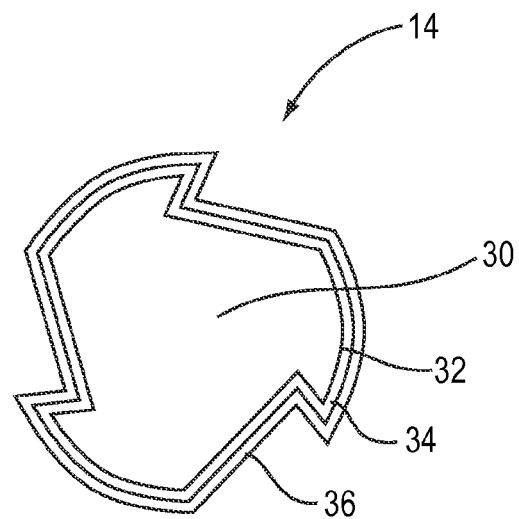
FIG. 6 is a side view of another embodiment of a step drill bit in accordance with the present invention.

Referring again to the drawings, FIG. 6 depicts a step drill bit 50 in accordance with embodiments of the present invention. The step drill bit 50 has similar components as does step drill bit 10 of FIG. 1, however, the plurality of steps 52 may be of different diameters.

Particular embodiments of the present invention may include a method of use of the step drill bit. The method may include the steps of coupling a step drill bit having three cutting surfaces to a drill; engaging the step drill bit to a working surface; activating the drill to rotate the step drill bit; drilling a hole to the desired step diameter of the step drill bit, wherein drilling the hole includes cutting the working material with three cutting edges. The method of use may further include wearing out a drill bit tip of the step drill bit and removing the worn drill bit tip and replacing the worn drill bit tip with a new drill bit tip. The method may further include repeatably removing and replacing the drill bit tip until the remainder of the step drill bit is worn to an unusable state.

Further, other particular embodiments of the present invention may include a method of manufacturing a step drill bit. The method may include manufacturing a step drill bit having three cutting edges; applying a first coating to an outer surface of the step drill bit; and applying a second coating over the first coating. The method may further include forming a drill bit tip having a shaft and forming a recess within a drill bit portion of the step drill bit that corresponds to the shaft of the drill bit tip.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

What is claimed is:

1. A step drill bit having a plurality of steps comprising: a drill bit portion having a plurality of cutting edges and a replaceable drill bit tip; wherein the drill bit portion further comprises a surface treatment comprising a first coating formed of titanium and a second overlaying coating formed of cobalt; and wherein the drill bit tip is removably coupled to the drill bit portion.

2. The step drill bit of claim 1, wherein the replaceable drill bit tip comprises a centrally located connection shaft.

3. The step drill bit of claim 2, wherein the connection shaft is disposed along a central axis of the drill bit tip.

4. The step drill bit tip of claim 2, wherein the connection shaft is integral with the drill bit tip.

5. The step drill bit of claim 2, wherein the drill bit portion comprises a corresponding recess to said connection shaft.

6. The step drill bit of claim 1, wherein the drill bit tip is coaxially coupled to the drill bit portion.

7. The step drill bit of claim 6, wherein the drill bit tip includes one type of drill bit and the drill bit portion includes another type of drill bit.

8. The step drill bit of claim 1, wherein the plurality of steps is of different dimensions.

9. The step drill bit of claim 1, wherein the drill bit portion includes three cutting edges.

10. A step drill bit comprising: a drill bit portion having a surface treatment comprising a first coating formed of titanium and a second overlaying coating formed of cobalt and a plurality of cutting edges and a plurality of steps within a predetermined range of diameters, said cutting edges being equally spaced along said drill bit portion and located within a plurality of corresponding respective planes that extend the length of the drill bit portion, wherein the planes do not intersect a longitudinal central axis of the step drill bit; and a replaceable drill bit tip, provided along a predetermined section of said drill bit portion, said drill bit tip being removably coupled to said drill bit portion via a centrally located shaft.

11. The step drill bit of claim 10, wherein the shaft is disposed along a central axis of the drill bit tip.

12. The step drill bit tip of claim 10, wherein the shaft is integral with the drill bit tip.

13. The step drill bit of claim 10, wherein the drill bit portion comprises a corresponding recess to said shaft.

14. The step drill bit of claim 10, wherein the drill bit tip is coaxially coupled to the drill bit portion.

15. The step drill bit of claim 10, wherein the drill bit portion includes three cutting edges.

16. The step drill bit of claim 1, wherein the plurality of cutting edges are located within a plurality of corresponding respective planes that extend the length of the drill bit portion, wherein the planes do not intersect a longitudinal central axis of the step drill bit.

17. The step drill bit of claim 16, wherein the planes intersect each other at equal angles.

18. The step drill bit of claim 17, the equal angles may be sixty degrees.

19. The step drill bit of claim 10, wherein the planes intersect each other at equal angles.

* * * * *